(12) United States Patent  
Kaida

(10) Patent No.: US 7,646,929 B2  
(45) Date of Patent: Jan. 12, 2010

(54) SIGNAL-TRANSMITTING SYSTEM, DATA-TRANSMITTING APPARATUS AND DATA-RECEIVING APPARATUS

(75) Inventor: Shunsuke Kaida, Tokyo (JP)

(73) Assignee: Sony Corporation (JP)

( * ) Notice: Subject to any disclaimer, the term of this patent is extended or adjusted under 35 U.S.C. 154(b) by 905 days.

(21) Appl. No.: 11/068,198

(22) Filed: Feb. 28, 2005

(65) Prior Publication Data

US 2005/0196061 A1     Sep. 8, 2005

(30) Foreign Application Priority Data

Mar. 4, 2004     (JP)     ............... 2004-061467

(51) Int. Cl.
*G06K 9/36*     (2006.01)
(52) U.S. Cl. .................. 382/236; 382/232; 375/240.12
(58) Field of Classification Search ...............
375/240.02–240.07, 240.12–240.17; 382/232–253;
345/2.1–2.3
See application file for complete search history.

(56) References Cited

U.S. PATENT DOCUMENTS

| | | | | |
|---|---|---|---|---|
| 5,325,124 A * | 6/1994 | Keith | ................ | 375/240.25 |
| 5,325,126 A * | 6/1994 | Keith | ................ | 375/240.12 |
| 5,557,298 A * | 9/1996 | Yang et al. | ................ | 715/781 |
| 5,754,700 A * | 5/1998 | Kuzma | ................ | 382/236 |
| 6,343,313 B1 * | 1/2002 | Salesky et al. | ................ | 709/204 |
| 6,825,846 B2 * | 11/2004 | Mondal | ................ | 345/547 |
| 2002/0196378 A1 * | 12/2002 | Slobodin et al. | ................ | 348/744 |
| 2005/0047775 A1 * | 3/2005 | Sakurai et al. | ................ | 396/430 |

FOREIGN PATENT DOCUMENTS

| | | |
|---|---|---|
| JP | 02-309777 A | 12/1990 |
| JP | 04-336896 A | 11/1992 |
| JP | 11-004461 A | 1/1999 |
| JP | 11-252542 A | 9/1999 |
| JP | 2001-103491 A | 4/2001 |

* cited by examiner

*Primary Examiner*—Bhavesh M Mehta
*Assistant Examiner*—Sean Motsinger
(74) *Attorney, Agent, or Firm*—Lerner, David, Littenberg, Krumholz & Mentlik, LLP

(57) ABSTRACT

In the data-transmitting apparatus, the image-comparing circuit compares, when a request for updating the image displayed is made, the image data item being input, with the image data item stored in the memories, which represents the preceding frame. The circuit therefore calculates the difference between the image data items compared. If the difference thus calculated by the image-comparing circuit is smaller than a prescribed value (if No in Step S1), the transmission-region data processing circuit generates, from the difference of the image data, the data that represents that part of the image data which corresponds to a region to be transmitted, and the data that represents this region. These data items generated by the circuit are transmitted. If the difference thus calculated is equal to or greater than the prescribed value (if Yes in Step S1), the coarse-image data processing circuit generates coarse image data, which is transmitted. Next, the high-precision image data processing circuit transmits full-size image data (Step S4).

8 Claims, 5 Drawing Sheets

IMAGE 1 TRANSMITTED
(COARSE IMAGE, 8 bits)

IMAGE 2 TRANSMITTED
(HIGH-PRECISION IMAGE, 24 bits)

SIGNAL-TRANSMITTING SYSTEM, DATA-TRANSMITTING APPARATUS AND DATA-RECEIVING APPARATUS

CROSS-REFERENCE TO RELATED APPLICATION

The present application claims priority from Japanese Patent Application No. JP 2004-061467, filed in the Japanese Patent Office on Mar. 4, 2004, the entire content of which is incorporated herein by reference.

BACKGROUND OF THE INVENTION

1. Field of the Invention

The present invention relates to a data-transmitting apparatus that transmits, for example, still-picture signals to a large-image display apparatus such as a projector or a PDP. The invention also relates to a data-receiving apparatus that receives signals transmitted and a data-transmitting system that uses the data-transmitting apparatus and the data-receiving apparatus.

2. Description of the Related Art

Image data processed in computers at present has high precision. To cope with this, the image resolution achieved by display elements has increased. In view of this technical trend, the technique of inputting image signals from computers to a liquid crystal projector and projecting the images represented by the signals, thereby to perform presentation has come into wide use in recent years. The cable generally used to input image signals from a computer to a projector is a bundle of five lines, i.e., three image signal lines and two sync signal lines. The image signal lines are R-image signal line, G-image signal line and B-image signal line. The sync signal lines are horizontal-sync signal line and vertical-sync signal line. Due to the band allocated to the signals, the cable is thick and short. This inevitably restricts the position of the computer and that of the projector, ultimately imposing limitations on the representation. To solve this problem, an image-transmitting system that transmits image signals by radio has been proposed (see, for example, Patent Document 1: Jpn. Pat. Appln. Laid-Open Publication 11-004461.)

In this image-transmitting system, input image data is stored in the transmitting-side frame memory. The data is read from the transmitting-side frame memory as serial data and transmitted in the form of infrared rays or radio waves. In the receiving side, the serial signal is converted back to a parallel signal. The parallel signal is stored in the receiving-side frame memory. The parallel signal is read from the receiving-side frame memory. From the parallel signal thus read an RGB-image data signal is restored.

Among the image signals generally used to perform representation is an image signal of XGA format. In the XGA format, the image size is 1024 pixels (in horizontal direction)×768 pixels (in vertical direction) and the clock frequency is 65 MHz if the frame frequency is 60 Hz. Each pixel requires 8 bits to achieve RGB presentation. Hence, the transmission rate for serial signals is about 1.6 GHz. For example, the signals may be sent by spatial transmission in infrared-ray communication at a band of about 100 MHz. In this case, the signals can be transmitted during a plurality of frame periods. However, only one frame of image can be transmitted during 16 frame periods. Here arises the problem that the cursor in the image moves unnaturally when a presenter moves a mouse.

The ordinary-image transmitting system employs an image-compression/coding scheme such as MPEG (Moving Picture Experts Group) or JPEP (Joint Photographic Expert Group). Whichever scheme the system employs, the quality of images is important. MPEG and JPEP are image-compression/coding schemes appropriate for encoding, mainly, natural images (video data). They are not fit for encoding computer outputs (particularly, high-precision text images). Further MPEG encoding involves motion detection for acquiring a motion vector from image data and also discrete cosine transform (DCT). The circuit that performs MPEG encoding inevitably be a large one. As a consequence, the image-transmitting system will be a large-scale and high-cost system.

In the case where an output from a computer is a file of the image displayed, the file can be transmitted via a LAN (Local Area Network). Recently a system using a radio LANs using 2.4 GHz band has come into being. This system can preserve the quality of the original images, but is disadvantageous in the following respect. Assume that, in the system, a computer is the transmission side and a display (monitor or projector) is the receiving side. Then, there is no problem with the transmission side, but the display, i.e., receiving side, needs to have a LAN function. Without a LAN function, the receiving side must have a computer. Consequently, the cost of the system will increase. Additionally, the LAN connection cannot be utilized only if a VGA cable connects the computer and the display. The method of setting the system is inevitably complicated.

In view of the above, a signal-transmitting system has been proposed. This system requires no complicated setting procedures. The system uses a method of reliably reproducing image data, regardless of the positions of the transmitting side and receiving side or the transmission rate. It is determined whether the image data of the frame now input differs from the image data of the previous frame input. Subsequently, a region of the image data, which is to be transmitted, is set, and the data showing the difference between the frames compared is added to the image data representing the region. The resultant image data is transmitted. (See, for example, Patent Document 2: Jpn. Pat. Appln. Laid-Open Publication No. 2001-103491.)

However, a greater part of the original image data input may change, or the data of an image to be displayed may greatly change as in the case of a page change. In either case, the amount of data to be transmitted increases, inevitably causing a time lag between the start of image-data transmission and the displaying of the image. Thus, the response time, i.e., time elapsing until the image is displayed, differs, from image data to image data. As a consequence, the image cannot be displayed at the very time it is explained in a presentation. This makes it impossible to perform smooth presentations.

SUMMARY OF THE INVENTION

The present invention has been made in consideration of the foregoing. An object of the invention is to provide a signal-transmitting system than can eliminate changes in the response time elapsing until an image is displayed after a request for updating the image displayed is made. Another object of the invention is to provide a data-transmitting apparatus and a data-receiving apparatus that constitute the signal-transmitting system.

A signal-transmitting system according to this invention comprises a data-transmitting apparatus. The data-transmitting apparatus comprises: a temporary memory means for temporarily storing image data representing a frame preceding an input image data; a comparing means for comparing the input image data with the image data stored in the temporary memory means and representing the preceding frame, for calculating a difference between each pixel data of the image data and a corresponding pixel data of the image data stored in the temporary memory means, and for calculating a value that is a sum of the difference and the image data; a differential image data generating means for setting a region of the image data, which is to be transmitted, in accordance with the difference calculated by the comparing means, and for generating differential image data by adding the data representing the region to be transmitted, to the data representing the difference of the image data for that region; a coarse-image data generating means for generating coarse image data from the input image data; a transmitting means for transmitting each image data to an external apparatus; and a transmission image data controlling means for performing a control so that the differential image data is transmitted to the external apparatus when the value calculated by the comparing means is smaller than a prescribed value, and that the coarse image data is first transmitted and the original input image data is then transmitted to the external apparatus when the value calculated by the comparing means is equal to or larger than the prescribed value.

The signal-transmitting system further comprises a data-receiving apparatus that is connected to the data-transmitting apparatus by a network. The data-receiving apparatus comprises: a receiving means for receiving data transmitted from the data-transmitting apparatus; a differential image data reproducing means for generating reproduction image data in accordance with differential image data received by the receiving means; a coarse-image data reproducing means for reproducing coarse image data received by the receiving means, an image data reproducing means for reproducing the original image data received by the receiving means; and a reproduced-data switching control means for switching the reproducing means in accordance with the image data received.

The signal-transmitting system determines whether only the difference of the image data or the entire image data should be updated, in accordance with the difference. If the entire image data must be updated, the coarse image data generated from the image data is output first, and then replacing the coarse image data with the original image data when it becomes possible to display the original image data.

In the system, the coarse-image data generating means may generate the coarse image data in such an amount that the one-frame data is transmitted in an amount not greater than the amount in which data can be transmitted for a predetermined period at the transmission rate of the transmitting means. Further, the coarse-image data generating means may generate image data having a gray scale lower than that of the input image data. Alternatively, the coarse-image data generating means may compress the input image data at a high compression rate thereby to generate coarse image data. The network is a radio communications network that accords with IEEE802.11b standards.

A data-transmitting apparatus according to this invention comprises: a temporary memory means for temporarily storing image data representing a frame preceding an input image data; a comparing means for comparing the input image data, with the image data stored in the temporary memory means and representing the preceding frame, for calculating a difference between each pixel data of the image data and a corresponding pixel data of the image data stored in the temporary memory means, and for calculating a value that is a sum of the difference and the image data; a differential image data generating means for setting a region of the image data, which is to be transmitted, in accordance with the difference calculated by the comparing means, and for generating differential image data by adding the data representing the region to be transmitted, to the data representing the difference of the image data for that region; a coarse-image data generating means for generating coarse image data from the input image data; a transmitting means for transmitting each image data to an external apparatus; and a transmission image data controlling means for performing a control so that the differential image data is transmitted to the external apparatus when the value calculated by the comparing means is smaller than a prescribed value, and that the coarse image data is first transmitted and the original input image data is then transmitted to the external apparatus when the value calculated by the comparing means is equal to or larger than the prescribed value.

A data-receiving apparatus according to the present invention comprises: receiving means for receiving data transmitted from an external data-transmitting apparatus through a network; a differential image data reproducing means for generating reproduction image data in accordance with differential image data received by the receiving means, the differential image data having been generated by adding data received by the receiving means and representing a region to be transmitted, to the data representing a difference of the image data for that region; a coarse-image data reproducing means for reproducing coarse image data received by the receiving means; an image data reproducing means for reproducing the original image data received by the receiving means; and a reproduced-data switching control means for switching the reproducing means in accordance with the image data received, so that the differential image data reproducing means generates reproduction image data from the differential image data transmitted from the data-transmitting apparatus, when a value calculated by adding the image data input to the data-transmitting apparatus, to the a difference of the image data for each pixel, calculated by comparing the input image data with image data representing a preceding frame, is smaller than a prescribed value, and so that the coarse-image data reproducing means reproduces the coarse image data transmitted from the data-transmitting apparatus, when the value is equal to or larger than the prescribed value.

The signal-transmitting system according to this invention can shorten the time that elapses until an image is displayed after a request for updating the image displayed is made. In addition, the system can realize a stable transmission of image data in data communication at a fixed transmission rate. The system is useful, particularly in transmitting high-precision image signals of XGA format or any hither mode.

DETAILED DESCRIPTION OF THE PREFERRED EMBODIMENTS

A signal-transmitting system, which is an embodiment of the present invention, is a system that comprises a data-processing terminal such as a personal computer (PC) and a peripheral apparatus connected to the terminal. In the system, the peripheral apparatus is an image-projecting apparatus (hereinafter referred to as "projector"). The projector is connected to the PC by a network. The image data that represents an image displayed on the monitor of the PC is transmitted to the projector. The projector can therefore project the image on a screen. The image data handled in this embodiment represents a still picture displayed on the computer screen. The still picture may be, mainly, a diagram or an image containing text data, which can be prepared and processed by using PC software. The still picture is an image more abstract than a picture that is represented by image data generated from a part of a photograph or a video picture.

In this system comprising the PC and the projector connected by the network, a time lag between the transmission of image data and the displaying of the image represented by this data occurs if that part of the image which should be updated as requested is large. This is inevitable when the amount of one-frame image data and the transmission rate of the network are taken into account. In the signal-transmitting system that is an embodiment of this invention, it is determined whether only the changed part of the image displayed should be updated, or coarse image data generated from the image data should be first output and then switched to the original image data when it is possible to display the original image. Hence, the system can eliminate changes in the response time elapsing until an image is displayed after a request for updating the image has been made.

Figure 1:
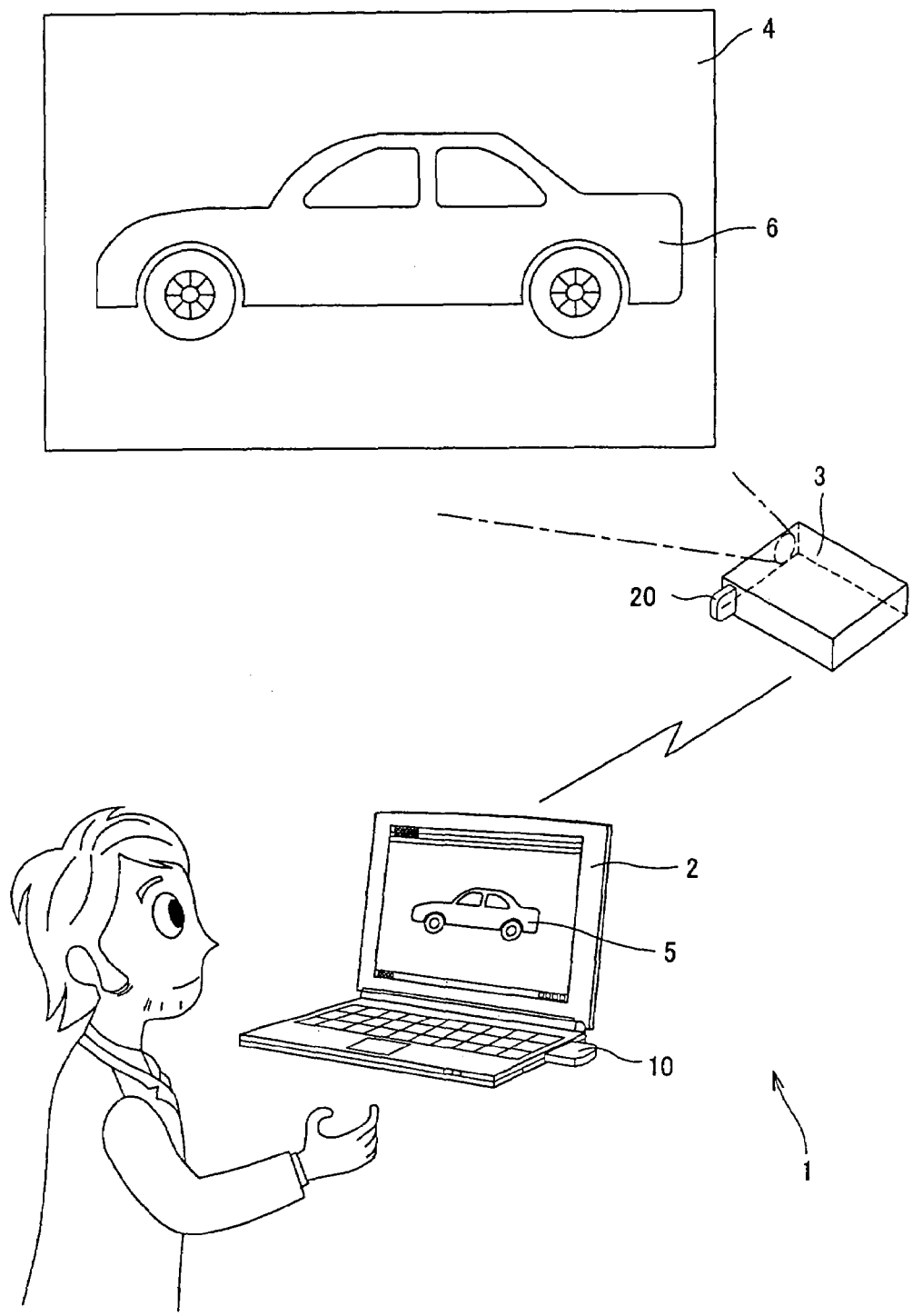
FIG. 1 is a diagram explaining an image display system that is an embodiment of this invention.

An image display system, i.e., an embodiment of this invention, will be described in detail with reference to the accompanying drawings. As FIG. 1 shows, the image display system 1 comprises a PC 2 and a projector 3. The PC 2 has a data-transmitting apparatus 10. The projector 3 has a data-receiving apparatus 20. Hence, data communication can be achieved between the PC 2 and the projector 3 through a network. The data-transmitting apparatus 10 can be connected to the PC 2 by, for example, a USB. The data-receiving apparatus 20 can be removably coupled to the projector 3 through a dedicated slot. The apparatus 20 may be of so-called "PC card type".

In the present embodiment, the PC 2 and the projector 3 are connected by a radio communications network that accords with IEEE802.11b, i.e., the standards stipulated by IEEE (The Institute of Electrical and Electronics Engineers, Inc.). The image data representing the image displayed on the monitor of the PC 2 is therefore transmitted to the projector 3 via the network, and the projector 3 projects the image on a screen 4. More precisely, as shown in FIG. 1, the projector 3 projects an image 6 on the screen 4, the image 6 being identical to the image 5 that is displayed on the monitor of the PC 2. Note that, in this embodiment, the image signal is a high-precision video signal called "XGA signal". The XGA signal represents an image having the size of 1024 pixels (in horizontal direction)×768 pixels (in vertical direction).

Figure 2:
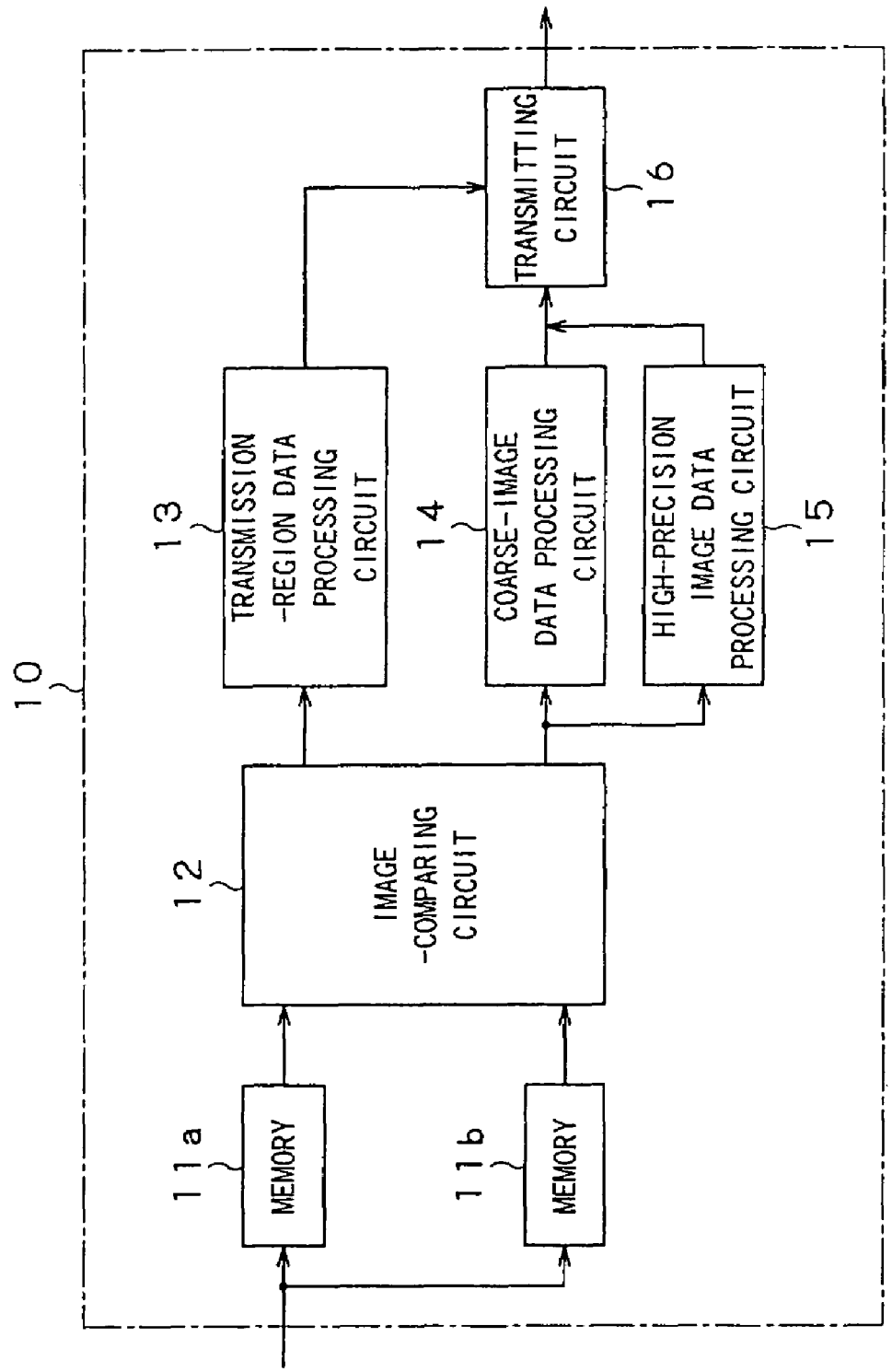
FIG. 2 is a diagram illustrating the configuration of a data-transmitting apparatus incorporated in the image display system.

Next, the data-transmitting apparatus 10 that transmits image data and the data-receiving apparatus 20 that receives image data, in this system, will be described. As FIG. 2 illustrates, the data-transmitting apparatus 10 comprises memories 11a and 11b, an image-comparing circuit 12, a transmission-region data processing circuit 13, a coarse-image data processing circuit 14, a high-precision image data processing circuit 15, and a transmitting circuit 16. The memories 11a and 11b temporarily store image data every time one-frame is input to the apparatus 10. The image-comparing circuit 12 compares the image data item representing one frame with the image data item representing the next frame, calculates a difference between the image data items compared, for each pixel, and finds a value for the entire image by adding the differences calculated for the entire image. The transmission-region data processing circuit 13 generates differential image data by adding the data representing a region of the image data, for which the differences calculated for are not zero, to the data representing the difference in the image data for this region. The coarse-image data processing circuit 14 generates coarse image data from the image data input. The high-precision image data processing circuit 15 transmits the input image data of XGA format. The transmitting circuit 16 generates radio-communication packets that accord with IEEE802.11b, and transmits the packets to the data-receiving apparatus. The components described above are controlled by control signals based on the sync signals that are supplied from a CPU (not shown) and the PC 2.

Figure 3:
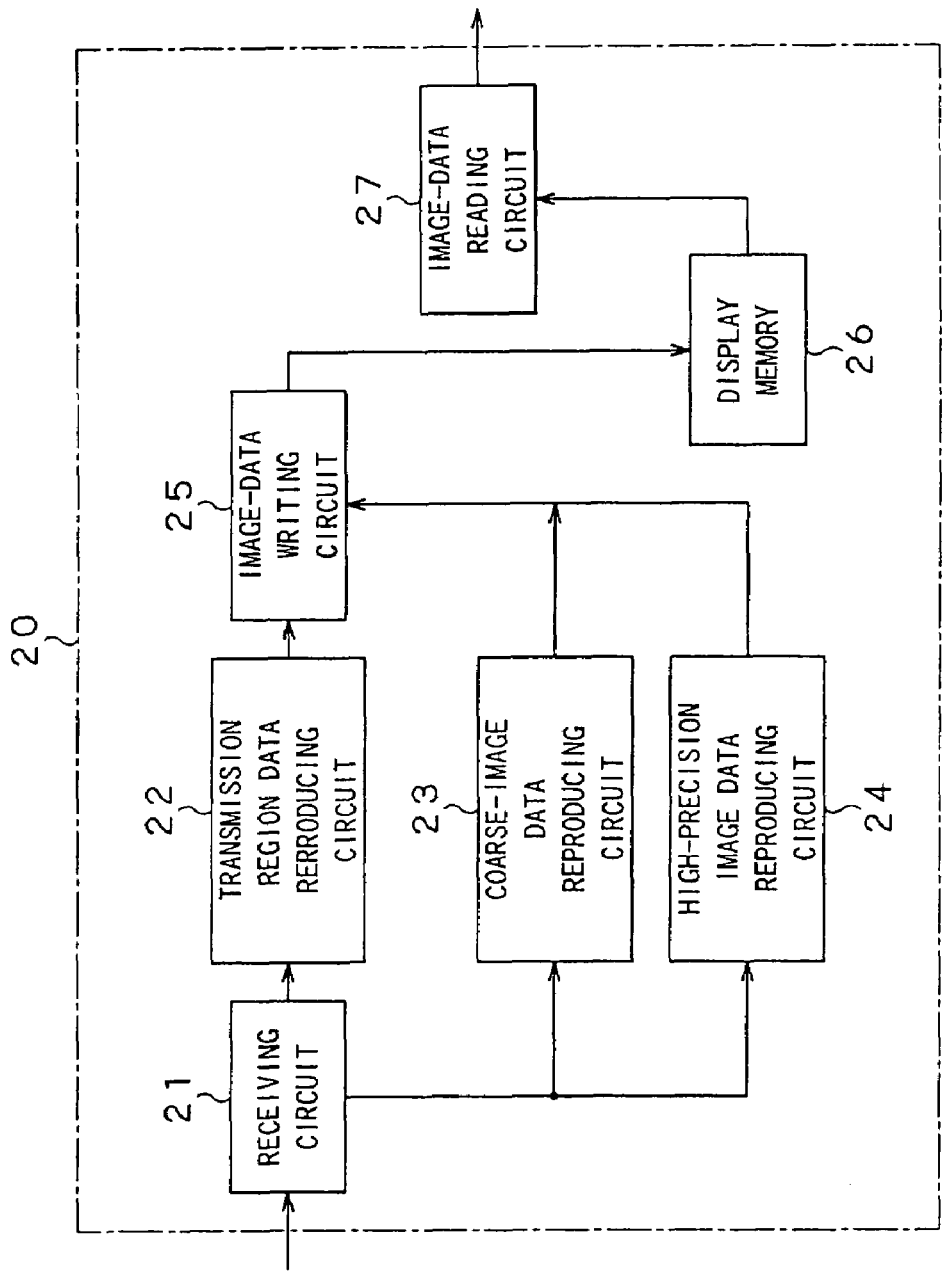
FIG. 3 is a diagram depicting the configuration of a data-receiving apparatus incorporated in the image display system.

As FIG. 3 shows, the data-receiving apparatus 20 comprises a receiving circuit 21, a transmission-region data reproducing circuit 22, a coarse-image data reproducing circuit 23, and a high-precision image data reproducing circuit 24. Further, the data-receiving apparatus 20 has an image-data writing circuit 25, a display memory 26, and an image-data reading circuit 27. The receiving circuit 21 receives data sent from the data-transmitting apparatus 10 through the network. The transmission-region data reproducing circuit 22 generates reproduction image data by superposing the difference of the image data representing the transmission region, on the immediately preceding image data, in accordance with the differential image data received by the receiving circuit 21. The coarse-image data reproducing circuit 23 reproduces the coarse image data that the receiving circuit 21 has received. The high-precision image data reproducing circuit 24 reproduces the XGA format original image data that the receiving circuit 21 has received. The image-data writing circuit 25 writes the image data transmitted from the apparatus 10 into the display memory 26. The image-data reading circuit 27 reads the image data from the display memory 26.

These circuits are controlled by a control unit that is not shown. The transmission-region data reproducing circuit 22 reproduces the differential image data, which the data-transmitting apparatus 10 has transmitted since the difference between the XGA format image data input to the apparatus 10 and the frame immediately preceding the image data, for the entire screen, is smaller than a prescribed value. The coarse-image data reproducing circuit 23 reproduces the coarse image data, which apparatus 10 has transmitted since the difference for the entire screen is equal to or greater than the prescribed value. Thus, the data reproducing circuit 22 and the data reproducing circuit 23 are switched from one to the other, in accordance with the image data that the apparatus 20 has received.

Each radio-communication packet generated by the transmitting circuit 16 contains header information that corresponds to transmission-region data, coarse image data or high-precision image data. Hence, the receiving circuit 21 distributes the received radio-communication packet to an optimum circuit in accordance with the header information.

Figure 4:
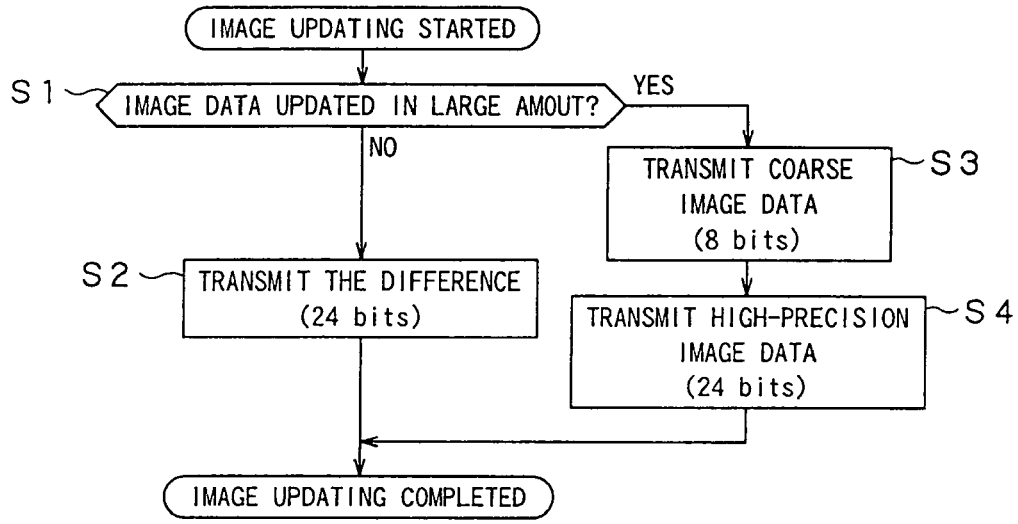
FIG. 4 is a flowchart explaining the screen-data transmitting process that the data-transmitting apparatus performs in the image display system.

The screen-data transmitting process that the data-transmitting apparatus 10 performs will be explained in detail, with reference to FIG. 4.

In the data-transmitting apparatus 10, under the control of the control unit, the image-comparing circuit 12 compares, when a request for updating the image displayed is made the image data item being input, with the image data item stored in the memory 1a or 11b, which represents the preceding frame. The circuit 12 therefore calculates the difference between the image data items compared. If the difference thus calculated is smaller, for the entire image, than the prescribed value, that is, if the undated amount of image data is small (if No in Step S1), the control unit generates a control signal for generating only the data that represents the difference. Upon receiving this control signal, the transmission-region data processing circuit 13 generates, from the difference of the image data, the data that represents that part of the image data which corresponds to the region to be transmitted, and the data that represents this region. These data items generated by the circuit 13 are transmitted (Step S2). This data is ordinary 24-bit data.

If the difference thus calculated is equal to or greater than the prescribed value, that is, if the undated amount of image data is large (if Yes in Step S1), the control unit generates a control signal for generating coarse image data. Upon receiving this control signal, the coarse-image data processing circuit 14 generates coarse image data that consists of the first one-third of 24-bit data (i.e., the first 8 bits). The coarse image data is transmitted (Step S3). Next, the high-precision image data processing circuit 15 transmits full-size image data (Step S4).

In the image-processing process described above, the gray-scale of the standard XGA format image data may be reduced and a non-reversible compression process, such as JPEG compression, may be carried out, when the coarse-image data processing circuit 14 generates coarse image data.

Figure 5:
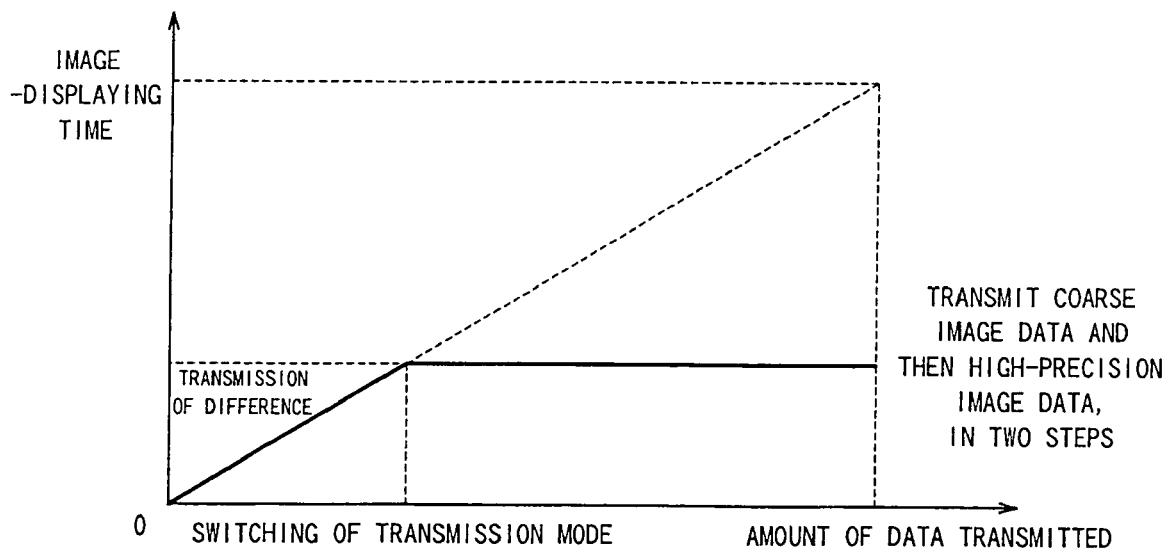
FIG. 5 is a graph showing the relation between an image-displaying time and an amount of image data transmitted, the image-displaying time being one elapsing until the image display system displays an image.

FIG. 5 is a graph that shows the relation between the image-displaying time and the amount of image data transmitted, which is observed in the image display system 1. As seen from FIG. 5, the time that elapses until the image is displayed differs, depending upon whether only the data showing the difference or the coarse image data is first transmitted, in accordance with the amount in which screen data has been updated. In the case where only the difference data is transmitted, the time increases as the difference of the image data increases, that is, as the mount of image data transmitted increase. Thus, the operation is switched from the process of transmitting data for a certain display time or transmitting only the data showing the difference, to the process of transmitting data in two steps, that is, first transmitting coarse image data and then transmitting high-precision image data. In this process, the time may be the period (about 0.25 sec) that elapses until a one-frame image is displayed if an XGA format image signal is transmitted in a radio band of about 100 MHz.

The image-transmitting process described above is performed in the image display system 1. The system 1 therefore determines whether only the difference of the image data or the entire image data should be updated in accordance with the difference of the image data. If the entire image data must be updated, the image data is transmitted in two steps, first the coarse image data generated from the image data is output, and then replacing the coarse image data with the original image data when it becomes possible to display the original image data.

Figure 6:
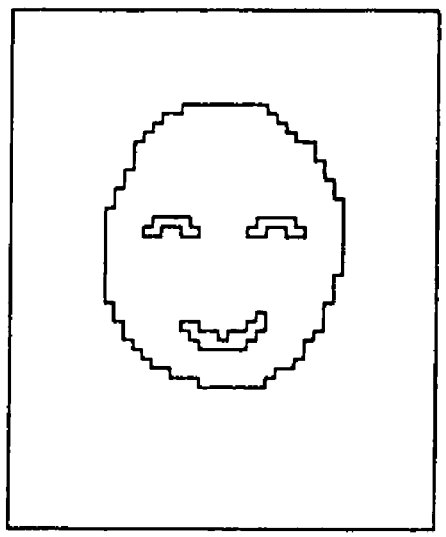
FIG. 6 shows two images displayed by the image display system, one represented by coarse image data and the other represented by ordinary image data.
Figure 6:
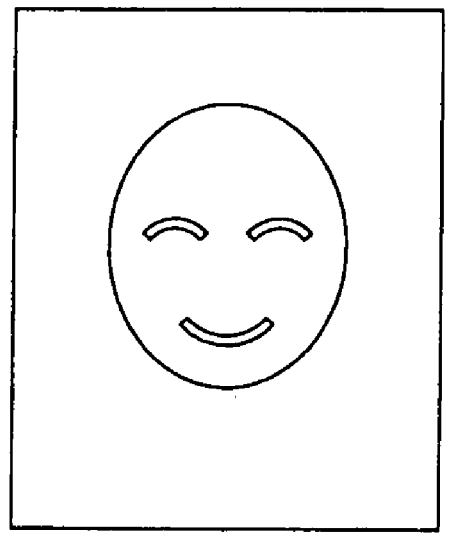

When the entire data is replaced, the image (computer image) projected to the screen 4 is of the type illustrated in FIG. 6. As schematically shown in FIG. 6, the image is coarser than an image represented by XGA-format image data in the image display system 1. Nonetheless, it can be displayed within a time not irritatingly long to the audience. The image is switched to a high-precision image when it becomes possible to display the high-precision image that is represented by the high-precision image data.

The image data may represent an image similar to a diagram or a text that is used in presentation. If this is the case, the coarse image data represents an image that the audience can hardly perceive as a coarse one. Thus, the audience feels that an image comparable with an ordinary high-precision image has been displayed completely and instantaneously. This helps to perform a smooth presentation.

The present invention is useful in the case where image data is transmitted in a great amount through a transmission path of a low transmission rate. Due to the low transmission rate, it takes a considerably long time to display a normal image. Nevertheless, this method can eliminate a time lag until the image is displayed.

What is claimed is:

1. A signal-transmitting system comprising:

a data-transmitting apparatus that comprises:

temporary memory means for temporarily storing image data representing a frame preceding an input image data;

comparing means for comparing the input image data with the image data stored in the temporary memory means and representing the preceding frame, for calculating a difference between each pixel data of the input image data and a corresponding pixel data of the image data stored in the temporary memory means, and for calculating a value that is a sum of the calculated differences;

differential image data generating means for setting a region of the input image data, which is to be transmitted, in accordance with the difference calculated by the comparing means, and for generating differential image data for the region which includes data representative of the region;

coarse-image data generating means for generating coarse image data from the input image data;

transmitting means for transmitting the differential image data or the coarse image data to an external apparatus; and transmission image data controlling means for performing a control so that the differential image data is transmitted to the external apparatus when the value calculated by the comparing means is smaller than a prescribed value, and that the coarse image data is first transmitted and original input image data is then transmitted to the external apparatus when the value calculated by the comparing means is equal to or larger than the prescribed value; and a data-receiving apparatus that is connected to the data-transmitting apparatus by a network and comprises:

receiving means for receiving data transmitted from the data-transmitting apparatus;

differential image data reproducing means for generating reproduction image data in accordance with differential image data received by the receiving means;

coarse-image data reproducing means for reproducing coarse image data received by the receiving means;

image data reproducing means for reproducing the original image data received by the receiving means; and reproduced-data switching control means for switching the reproducing means in accordance with the image data received.

2. The signal-transmitting system according to claim 1, wherein the coarse-image data generating means generates the coarse image data in such an amount that the one-frame data is transmitted in an amount not greater than the amount in which data can be transmitted for a predetermined period at the transmission rate of the transmitting means.

3. The signal-transmitting system according to claim 2, wherein the coarse-image data generating means generates image data having a gray scale lower than that of the input image data.

4. The signal-transmitting system according to claim 2, wherein the coarse-image data generating means compresses the input image data at a high compression rate.

5. The signal-transmitting system according to claim 1, wherein the network is a radio communications network that accords with IEEE802.11b standards.

6. A data-transmitting apparatus comprising:

temporary memory means for temporarily storing image data representing a frame preceding an input image data;

comparing means for comparing the input image data, with the image data stored in the temporary memory means and representing the preceding frame, for calculating a difference between each pixel data of the input image data and a corresponding pixel data of the image data stored in the temporary memory means, and for calculating a value that is a sum of the calculated differences;

differential image data generating means for setting a region of the input image data, which is to be transmitted, in accordance with the difference calculated by the comparing means, and for generating differential image data for the region which includes data representative of the region;

coarse-image data generating means for generating coarse image data from the input image data;

transmitting means for transmitting the differential image data or the coarse image data to an external apparatus; and transmission image data controlling means for performing a control so that the differential image data is transmitted to the external apparatus when the value calculated by the comparing means is smaller than a prescribed value, and that the coarse image data is first transmitted and original input image data is then transmitted to the external apparatus when the value calculated by the comparing means is equal to or larger than the prescribed value.

7. The signal-transmitting system according to claim 1, in which the data-transmitting apparatus is a personal computer, the data-receiving apparatus is an image-projecting apparatus, and the network is a radio communications network.

8. The signal-transmitting system according to claim 7, in which the input image data represents a still picture of a diagram or text.

* * * * *